(12) United States Patent
Foss

(10) Patent No.: US 8,821,081 B1
(45) Date of Patent: Sep. 2, 2014

(54) TOOL FOR REPAIRING CROSS-THREADING AND OTHER DAMAGE IN THREADED BLIND HOLES

(76) Inventor: Vernon L. Foss, Brooklyn Park, MN (US)

( * ) Notice: Subject to any disclaimer, the term of this patent is extended or adjusted under 35 U.S.C. 154(b) by 411 days.

(21) Appl. No.: 13/135,834

(22) Filed: Jul. 15, 2011

(51) Int. Cl.
B23G 5/08 (2006.01)

(52) U.S. Cl.
USPC ............. 408/1 R; 408/222; 470/200; 470/201

(58) Field of Classification Search
USPC .......... 470/198, 201–203, 200; 408/215, 222, 408/1 R, 153–159, 168, 172, 180
IPC ........................................ B23G 5/00,5/08, 5/14
See application file for complete search history.

(56) References Cited

U.S. PATENT DOCUMENTS

| | | | | |
|---|---|---|---|---|
| 270,216 A | * | 1/1883 | French | 408/156 |
| 275,815 A | * | 4/1883 | French | 408/156 |
| 1,232,480 A | * | 7/1917 | Bascom | 408/156 |
| 1,619,395 A | * | 3/1927 | Bartels | 408/154 |
| 1,877,251 A | * | 9/1932 | Miller | 470/96 |
| 2,279,085 A | * | 4/1942 | Winter | 408/156 |
| 2,284,768 A | * | 6/1942 | Ramsdell | 408/156 |
| 2,355,965 A | * | 8/1944 | Frishette | 408/156 |
| 2,360,472 A | * | 10/1944 | Brussell | 408/156 |
| 2,391,223 A | * | 12/1945 | Burrows | 408/215 |
| 4,090,808 A | * | 5/1978 | Nannen | 408/222 |
| 4,661,028 A | | 4/1987 | Sanger | |
| 5,281,059 A | | 1/1994 | Stuckle | |
| 5,718,636 A | * | 2/1998 | Meyn et al. | 470/203 |
| 7,972,094 B2 | * | 7/2011 | Men et al. | 408/231 |

FOREIGN PATENT DOCUMENTS

| | | | |
|---|---|---|---|
| GB | 563102 A | * | 7/1944 |
| JP | 51020766 A | * | 2/1976 |
| WO | WO 8800103 A | * | 1/1988 |

* cited by examiner

Primary Examiner — Daniel Howell

(57) ABSTRACT

A slotted inverse tap, compressible for insertion past damaged entry threads in blind holes. (FIG. 1 thru FIG. 5) The tool can be made to smaller sizes than that of prior art. An elongate slot (23) proceeds through a first threaded end (21), then well into a reduced diameter cylindrical body (25). After insertion to the hole bottom, a tabbed shim (28) is inserted to the slot from its side, then pressed down until stopped. The shim (28) enforces mating engagement with undamaged internal threads. A second end of hex and/or squared or other configuration facilitates use of a tap wrench or other tool for rotational extraction. Damaged threads are reformed/re-cut upon rotational withdrawal.

3 Claims, 2 Drawing Sheets

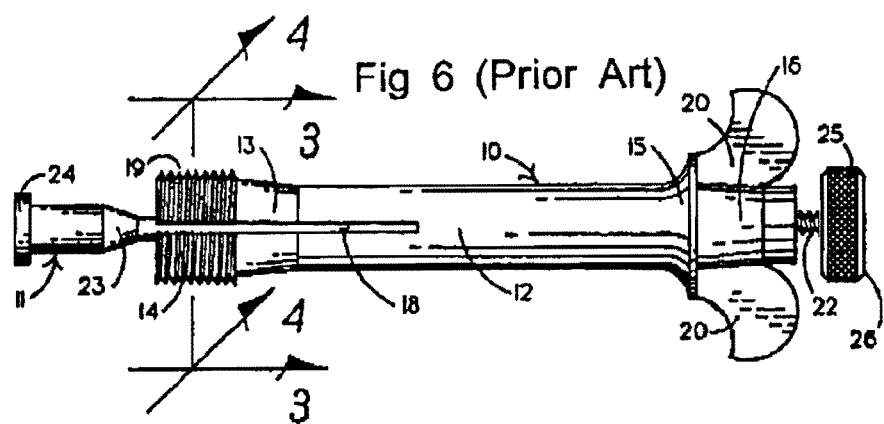
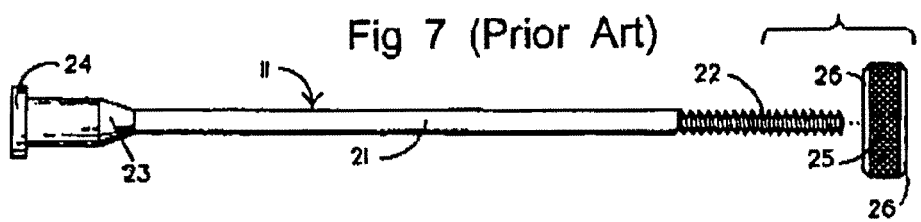

TOOL FOR REPAIRING CROSS-THREADING AND OTHER DAMAGE IN THREADED BLIND HOLES

CROSS-REFERENCE TO RELATED APPLICATIONS

Non-applicable

FEDERALLY SPONSORED RESEARCH

Non-applicable

SEQUENCE LISTING OR PROGRAM

Non-applicable

BACKGROUND AND DESCRIPTION OF PRIOR ART

This application applies to tools for repairing damaged internal threads in blind holes.

The following is a tabulation of some prior art that presently appears relevant:

| U.S. Patents | | |
| --- | --- | --- |
| Pat. No. | Issue Date | Patentee |
| 5,281,059 | Jan. 25, 1994 | Stuckle |
| 4,661,028 | Apr. 1987 | Sanger |
| 4,090,808 | May 23, 1978 | Nannen |

A satisfactory tool has not existed for the repair of cross-threaded and otherwise damaged threaded blind holes. Most commonly, such damage is caused by forcing a misaligned bolt, or forcing a mismatched thread.

To be effective, a thread repairing tool must be aligned with the existing undamaged threads. Repair attempted with a conventional tap can prove disastrous, either destroying or severely weakening the remaining threads. Tools of the prior art have not accomplished this end effectively, or are overly complicated, therefore expensive, and are not downwardly scalable to accommodate a variety of hole sizes.

The tool disclosed by Stuckle, in U.S. Pat. No. 5,281,059 is representative of prior devices. A reduced diameter threaded portion is inserted past the damaged thread entry to engage with the interior undamaged threads. As with his citing of Sanger in U.S. Pat. No. 4,661,028, he uses a forcing cone (23) to expand the tool into mating engagement with the internal undamaged threads. With that forcing cone (23), his tool cannot be downscaled much, to accommodate smaller hole sizes. It also requires extensive machining of its several components, substantially increasing cost. His finger grips (20) are particularly problematic for forming/machining.

Stuckle cites a spark plug hole as his primary example. Most spark plugs have a fine-threaded 14 mm OD (approximately 9/16 in). A coarse thread of the same size being much deeper would require that his threaded element be considerably smaller, exacerbating his scalability problem.

SUMMARY OF INVENTION

My tool consists of a slotted inverse short tap, providing two cutting edges, with threads of the diameter and pitch of the threaded blind hole to be repaired. An elongate slot proceeds from the tap end, through the threaded portion, thence well into the cylindrical mid-body of the tool. The slot allows the tool to be compressed diagonally for insertion past the damaged entry threads. Cutting edges are formed on the slot edges.

The threads are tapered on their inner extent to provide initial progressive cutting edges. The trailing heel edges of the threaded portion are relieved to provide clearance for entry when diagonally compressed. Beyond the threads, the body of the tool is of a reduced diameter, slightly smaller than the thread inside diameter, to provide clearance of the internal threads. The second end of the tool has a hex and/or square end, to facilitate turning with a tap wrench or other tool.

After insertion of the tool to the hole bottom, a Tabbed Shim is inserted to the slot from its side, then pressed down until stopped. The shim is of the thickness and width of the slot, thus bracing mating engagement with undamaged internal threads. The tab prevents loss into the hole, with its small hole anchoring a retaining cord.

The tool can be made of relatively mild or cold-rolled steel for ease of machining, with subsequent case-hardening of the threaded portion for durability.

After insertion of the compressed tool to the bottom of the hole, a tabbed shim of the thickness and width of the slot is inserted into the elongated slot from its side, then pressed down until stopped at the hole bottom. The shim braces the tap to its original diameter, enforcing mating engagement with the internal threads.

The tool is then rotationally extracted with a tap wrench or other tool, re-cutting and reforming the damaged entry threads.

Optionally, for the next larger hole size, a wedge can be inserted into the end of the tool. The tool is then inserted to the bottom of the hole and pressed down to engage the wedge, forcing mating engagement of compatible internal threads. By rotationally withdrawing the tap, the damaged threads are re-cut/restored. It is preferred however, that a single tap be available in each size.

In providing such a tool it is a principle object to repair damaged threads in blind holes.

A further object is to provide such a tool that is new and novel, of simple, durable, and frugal design, being well suited to its intended use.

Another object is to provide downward scalability; to provide the tool in sets covering all standard thread sizes; coarse and fine, Metric and SAE, down to a practical minimum size.

BRIEF DESCRIPTION OF THE DRAWINGS

FIGS. 6 and 7 show an example of Prior Art, views of Stuckle's tool, U.S. Pat. No. 5,281,059.

Figure 1:
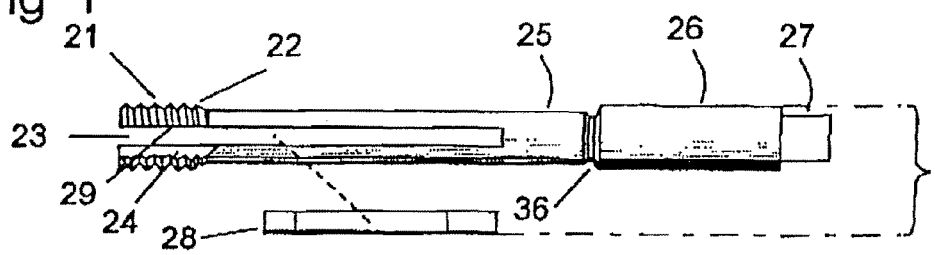
FIG. 1 is a side view of tool and shim (28)

| DRAWINGS-REFERENCE NUMERALS | |
| --- | --- |
| 21 | Threaded End |
| 22 | Taper |
| 23 | Slot |
| 24 | Heel Relief |
| 25 | Reduced Diameter Body |
| 26 | Cylindrical Body |

-continued

DRAWINGS-REFERENCE NUMERALS

| | |
|---|---|
| 27 | Square End |
| 28 | Tabbed Shim |
| 30 | Wedge |
| 31 | Chamfered Edge |
| 36 | Groove |

DETAILED DESCRIPTION OF THE INVENTION

FIG. 1 shows an orthographic 'side' view of my tool showing its various parts, their configuration and relationships. Included is a side view of the tabbed shim (28).

Figure 2:
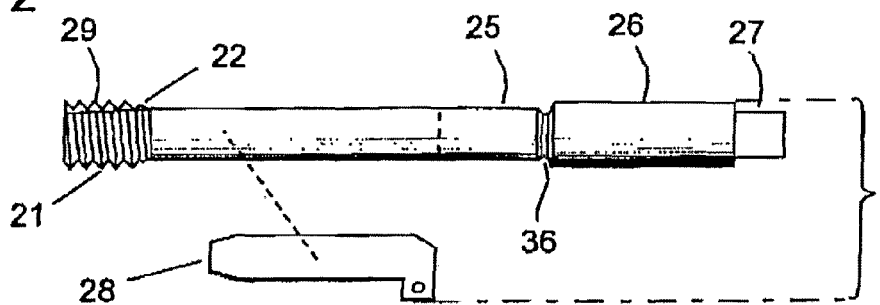
FIG. 2 is a top view of tool and shim (28)

FIG. 2 shows an orthographic 'top' view of the tool of FIG. 1, including a top view of the tabbed shim (28).

Figure 3:
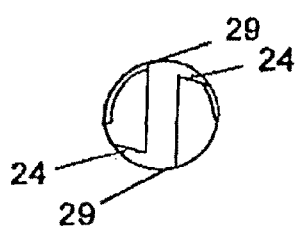
FIG. 3 is an end view of threaded end of Tool in relaxed condition.

FIG. 3 shows an end view of the first threaded end (21) of the tool of FIG. 1 in a relaxed condition. Enumerated are Cutting edge(s) (29), Slot (23), and heel relief (24).

Figure 4:
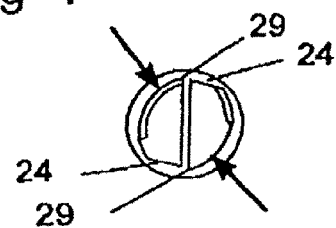
FIG. 4 is an end view of compressed threaded end of tool.

FIG. 4 shows an end view of the tool of FIG. 1, illustrating its diagonal compression, for insertion past the damaged entry threads in a blind hole. Arrows indicate direction of compression, applied with vise-grip or pliers on the slotted reduced diameter body (25) of the tool.

Figure 5:
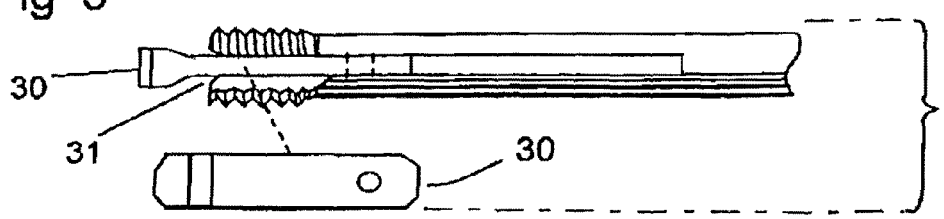
FIG. 5 is a side view of tool with expansion wedge (30), top view of wedge (30).

FIG. 5 shows insertion of a wedge (30) into the end of the tool for expanding it to the next larger standard size. Slot end edges (31) are chamfered for wedge entry. The wedge is inserted into the end of the tool, which is then inserted to the bottom of the hole, and pressed down to engage the wedge (30). Note that this is applicable only to certain SAE fine threads, and several metric thread pitches.

FIGS. 6 and 7 show an example of Prior Art, views of Stuckle's tool, U.S. Pat. No. 5,281,059. My tool has a slotted elongate cylindrical body (26) with a short threaded first end (21). The cutting edge(s) (29) are formed by an elongate slot (23). The slot (23) proceeds through the threaded end (21) and well into the reduced diameter body (25) of the tool. The threaded section is tapered on its inner extent, the taper (22) providing the initial progressive cutting edges. The heel relief (24) of each finger provides clearance sufficient for entry past the damaged threads. The slot (23) is of sufficient width and length to enable the necessary compressibility, and for insertion of the tabbed shim (28). The second end (27) is of hex and/or squared configuration to facilitate the use of a tap wrench or other tool for rotational extraction. Groove (36) anchors shim retaining cord.

CONCLUSION, RAMIFICATIONS AND SCOPE

Thus the reader will see that this embodiment of my tool provides new capability for the economic repair of damaged internal threads.

While my above description contains many specificities, these should not be construed as limitations of the scope, but rather as an exemplification of this embodiment. For example: In the larger sizes, where the slot and shim can be thicker, the heel relief might be eliminated, particularly with some fine-thread versions. Additionally, a length of drill-rod inserted through a hole in the second end of the tool forms a T-Handle for turning the tool.

Accordingly, the scope should be determined not by the embodiment illustrated, but by the appended claims, and their legal equivalents.

I claim:

1. A tool for repairing damaged internal threads in blind holes, comprising: an elongated tool body with a first end having a short inverse threading tap of the diameter and pitch of the undamaged internal threads in that hole, a second end having a shape suitable to permit engagement and rotation of the body by a rotary drive, an elongated reduced diameter cylindrical body extending from the inverse threading tap toward the second end, the reduced diameter cylindrical body having a diameter slightly smaller than the internal diameter of the threads in the hole, an elongated slot extending from the first end through the threading tap and well into the reduced diameter cylindrical body, the slot permitting the inverse threading tap to be compressed and inserted past the damaged entry threads, the slot also forming two diametrically opposite cutting edges for the threading tap, a tabbed shim with a first portion having the same width of the reduced diameter cylindrical body and a thickness of said elongated slot, the tabbed shim having a second portion forming a laterally extending tab that will seat on the entrance of the internally threaded hole in order to prevent loss of the shim into the threaded hole, and the elongated slot being of a sufficient length for insertion of the shim into the slot after insertion of the tool into the threaded hole.

2. The tool of claim 1, further comprising a taper of the axially inward extent of the threading tap.

3. A method of repairing damaged internal threads in a blind hole, comprising the steps of providing an elongated tool body with a first end having a short inverse threading tap of the diameter and pitch of the undamaged internal threads in that hole, providing a second end having a shape suitable to permit engagement and rotation of the body by a rotary drive, providing an elongated reduced diameter cylindrical body extending from the inverse threading tap toward the second end, the reduced diameter cylindrical body having a diameter slightly smaller than the inside diameter of the threads in the hole, providing an elongated slot extending from the first end through the threading tap and well into the reduced diameter cylindrical body, the slot forming two diametrically opposite cutting edges for the threading tap, compressing the slot to permit the inverse threading tap to be inserted past the damaged entry threads, inserting a tabbed shim with a first portion having the same width of the reduced diameter cylindrical body and a thickness of said elongated slot into the slot in order to expand the threading tap on the internal threads of the hole, seating a laterally extending tab of the shim on the entrance of the internally threaded hole in order to prevent loss of the shim into the threaded hole, and rotating the tool in a direction to withdraw it from the hole in order to reform and recut the damaged entry threads of the hole.

\* \* \* \* \*